(12) United States Patent
Venkataswami et al.

(10) Patent No.: US 11,457,025 B2
(45) Date of Patent: Sep. 27, 2022

(54) METHOD AND SYSTEM FOR DETECTING AND PREVENTING DATA EXFILTRATION ATTACKS

(71) Applicant: GAVS Technologies Pvt. Ltd., Chennai (IN)

(72) Inventors: Balaji Venkat Venkataswami, Chennai (IN); Suri Parthasarathy, Chennai (IN); Chandramouleeswaran Sundaram, Coimbatore (IN); Ragavendran Selvaraj, Chennai (IN); Mohamed Ismail Ibrahim, Chennai (IN); Chandrasekar Balasubramanian, Chennai (IN)

(73) Assignee: GAVS Technologies Pvt. Ltd., Chennai (IN)

( * ) Notice: Subject to any disclaimer, the term of this patent is extended or adjusted under 35 U.S.C. 154(b) by 493 days.

(21) Appl. No.: 16/416,063

(22) Filed: May 17, 2019

(65) Prior Publication Data

US 2020/0267167 A1  Aug. 20, 2020

(51) Int. Cl.
| | |
|---|---|
| H04L 29/06 | (2006.01) |
| H04L 12/24 | (2006.01) |
| H04L 12/26 | (2006.01) |
| H04L 9/40 | (2022.01) |
| H04L 41/0213 | (2022.01) |
| H04L 69/16 | (2022.01) |
| H04L 43/12 | (2022.01) |

(52) U.S. Cl.
CPC ...... *H04L 63/1416* (2013.01); *H04L 41/0213* (2013.01); *H04L 43/12* (2013.01); *H04L 63/0281* (2013.01); *H04L 63/101* (2013.01); *H04L 63/1425* (2013.01); *H04L 63/1466* (2013.01); *H04L 69/16* (2013.01)

(58) Field of Classification Search
CPC ... H04L 41/0213; H04L 43/12; H04L 63/101; H04L 63/1416; H04L 63/1425; H04L 63/1466; H04L 69/16
See application file for complete search history.

(56) References Cited

U.S. PATENT DOCUMENTS

| | | | | |
|---|---|---|---|---|
| 7,555,743 | B2* | 6/2009 | Sridhar | G06F 8/20 |
| | | | | 717/106 |
| 10,594,712 | B2* | 3/2020 | Mestha | G06N 3/084 |
| 10,911,471 | B1* | 2/2021 | Song | G06N 7/005 |
| 10,986,213 | B2* | 4/2021 | Venkataswami | H04L 67/34 |

(Continued)

*Primary Examiner* — Thomas J Dailey
(74) *Attorney, Agent, or Firm* — Convergence Intellectual Property Law P.C.; Jonathan Garfinkel

(57) ABSTRACT

A method and system for detecting and preventing data exfiltration attacks is disclosed. The system includes a manager device and an endpoint device, and an attack prevention device. The method includes detecting, at plurality of endpoint devices, downloads made at endpoint devices using Simple Network Management Protocol (SNMP) proxy. Next, the method includes mirroring network traffic associated with the downloads. The method further includes providing the mirrored network traffic as an input to a deep learning model, wherein the deep learning model detects presence of malware in the downloads. Finally, the method involves sending, by the manager device, an alert to one or more devices to prevent, recover, or mitigate data exfiltration attacks.

18 Claims, 13 Drawing Sheets

(56) References Cited

U.S. PATENT DOCUMENTS

| | | | | |
|---|---|---|---|---|
| 2004/0049693 A1* | 3/2004 | Douglas | ............... | G06F 21/552 |
| | | | | 726/23 |
| 2006/0172742 A1* | 8/2006 | Chou | ............... | H04L 41/0213 |
| | | | | 455/450 |
| 2014/0280829 A1* | 9/2014 | Kjendal | ............... | H04L 43/028 |
| | | | | 709/223 |
| 2018/0288086 A1* | 10/2018 | Amiri | ............... | G06F 40/126 |
| 2020/0045063 A1* | 2/2020 | Zhang | ............... | G06N 3/08 |
| 2020/0104498 A1* | 4/2020 | Smith | ............... | H04L 63/1416 |

\* cited by examiner

METHOD AND SYSTEM FOR DETECTING AND PREVENTING DATA EXFILTRATION ATTACKS

CROSS REFERENCE TO RELATED APPLICATIONS

This application claims priority to Indian patent application No. 201941006651, filed on 20 Feb. 2019, the full disclosure of which is incorporated herein by reference.

FIELD OF THE INVENTION

The disclosure relates generally to security and networking, more specifically but not exclusively relates to methods, systems and devices for detecting and preventing data exfiltration attacks.

DESCRIPTION OF THE RELATED ART

Data exfiltration is a malicious activity that involves unauthorized copying or transfer of data from a computer or other device. Such activities may also be referred to as data extrusion, data exportation, or data theft. According to state of the art, security breaches associated with data exfiltration may be performed manually, by an individual with physical access to a computer, or by an automated process conducted through malicious programming over a network.

While data exfiltration can be achieved using various techniques, it is most commonly performed by cyber criminals over the Internet or any network. The attacks are typically targeted, with the primary intention to gain access to a network or machine to locate and copy specific data. Detecting a data exfiltration attack can be challenging as it closely resembles or mimics typical network traffic, thereby allowing substantial data loss incidents to fly under the radar. Therefore, valuable data of organizations are vulnerable to attacks from hackers and the damages inflicted can be immeasurable.

Statistically, systems that rely on vendor-set, common, easy-to-crack passwords are most vulnerable to data exfiltration. Hackers can gain access to target machines through remote applications or by installing a removable media device, in cases where they have physical access to the target machine. For instance, hackers carry out cyber-attacks, such as advanced persistent threats (APTs), in which data exfiltration is often a primary goal. APTs consistently and aggressively target specific companies or organizations with the goal of accessing or stealing restricted data. The goal of an APT is to gain access to a network, but remain undetected as it stealthily seeks out the most valuable or target data, such as trade secrets, intellectual property, financial information, or sensitive customer data.

APTs may rely on social engineering techniques or phishing emails with contextually relevant content to persuade an organization's users to inadvertently open messages containing malicious scripts, which can then later be used to install additional malware on the organization's network. Following this exploit is a data discovery stage, during which hackers rely on data collection and monitoring tools to identify the target information. Once the desired data and assets are discovered, data exfiltration techniques are used to transfer the data. When cyber criminals successfully carry out data exfiltration, they may use the newly obtained data to damage a organizations' reputation, for financial gain, or sabotage.

As data exfiltration relies on social engineering techniques to gain access to protected organization networks, preventing users from downloading unknown or suspicious applications is a proactive and preventative measure that organizations must take. However, it is quite difficult to adequately block the download of these malicious applications without restricting access to applications the users need.

Further, in order to effectively compromise an endpoint, malware communicates externally with a command or control server to receive instructions or exfiltrate data. Detecting and blocking this unauthorized communication could be a viable method for preventing data exfiltration.

Data exfiltration focuses on retrieving, transferring, and copying data on endpoints. However, endpoints have historically provided to be one of the easiest access points for hackers. Therefore, enterprises must look to comprehensive endpoint detection solutions as a first-line defense against threats like data exfiltration. Data exfiltration seems like an easily preventable process, but the advanced attacks that occur regularly in the modern threat landscape require an all-encompassing approach to data protection that adequately monitors and protects every endpoint that exists within an organizations' network.

Various publications have attempted to address some of the challenges associated with detection, prevention, mitigation and recovery associated with data exfiltration attacks as described above. For instance, U.S. Ser. No. 10/129,270B2 discloses apparatus, system and method for identifying and mitigating malicious network threats. US20180262533A1 discloses monitoring device data and gateway data. US20170279829A1 discloses dynamic device clustering using device profile information. However, these references do not solve the aforementioned drawbacks to tackle data exfiltration attacks effectively.

SUMMARY OF THE INVENTION

The present subject matter relates to methods and systems for detecting and preventing data exfiltration attacks in a network.

According to one embodiment of the present subject matter, a method of detecting data exfiltration attacks in a network is provided. The method includes detecting downloads made at one or more endpoint devices using a Simple Network Management Protocol (SNMP) proxy installed therein, wherein the SNMP proxy detects download activity based on management information base (MIB) data. Next, the method includes mirroring network traffic associated with the downloads. The manager device receives MIB data streams associated with the downloads from the SNMP proxy and mirrored network traffic streams associated with the downloads The method further includes providing the mirrored network traffic streams as an input to a deep learning model, wherein the deep learning model detects presence of a malware in the downloads. Finally, the method includes sending, by the manager device, an alert to one or more devices to prevent, recover, or mitigate data exfiltration attacks.

In various embodiments, the mirrored traffic streams are received from a network device or the endpoint devices. The mirrored traffic streams received from the network device are port mirrored in an encrypted form. The mirrored traffic streams received from the endpoint device are in a decrypted form, and wherein the decrypted mirrored traffic streams are received in a parallel TCP or UDP connection by the manager device. The method further includes detecting endpoint devices accessing potential blacklisted websites using SNMP proxy. The method may also include determining fully qualified domain names of the accessed websites using reverse domain resolution; determining specific URLs accessed based on HTTP traces; and accessing URL contents from the accessed sites using web scraping tools. The method may also include providing the contents of the web scraped URLs to a deep learning model, wherein the deep learning model determines blacklisted websites. Further, the method may include preventing, at the endpoint device, access to the blacklisted websites. In some embodiments, the method may further include tracking, by SNMP proxy at the endpoint device, suspicious uploads to an external network; receiving, by the manager device, mirrored traffic streams associated with the suspicious upload from a network device; and decrypting, by the manager device, the suspicious uploads to determine upload content. In one embodiment, the manager device receives the mirrored traffic streams directly from the SNMP proxy in a parallel TCP/UDP connection.

In various embodiments, mirroring the network traffic comprises creating and sending a copy of network data packets associated with downloads. In some embodiments, the method further includes creating a training dataset, a validation dataset, and a test dataset from historical network traffic. The deep learning model is trained using the training dataset to detect presence of a malware associated with the network traffic. The method may also include tuning the deep learning model using the validation dataset and evaluating the performance of the deep learning model using the test dataset.

According to another embodiment of the present subject matter, a system for detecting and preventing data exfiltration attacks in a network is provided. The system includes a plurality of endpoint devices comprising a first memory unit coupled to a first processing unit, wherein the first memory unit comprises a SNMP proxy module configured to: detect downloads made at the plurality of endpoint devices based on management information base (MIB) data; and identify access to potential blacklisted websites at the endpoint device. The system also includes one or more manager devices for monitoring and detecting data exfiltration attacks, wherein the manager device comprises: a second memory unit coupled to a second processing unit, wherein the memory unit comprises a plurality of modules executed by the processing unit. The plurality of modules comprises a reception module, a malware detection module, and an alert module. The reception module is configured to receive MIB data streams associated with the downloads from the SNMP proxy and mirrored network traffic streams associated with the downloads. The malware detection module is configured to detect presence of malware in the downloads using a deep learning model based on the mirrored network traffic. The alert module is configured to generate and send an alert indicative of malware detection. The system further includes an attack prevention device configured to receive the alerts, the attack prevention device comprising a third memory unit coupled to a third processing unit, wherein the third memory unit comprises: a content-aggregation module configured to access URL contents associated with accessed websites using web scraping tools; a blacklisting module configured to: provide the contents of the web scraped URLs to a deep learning model, wherein the deep learning model determines blacklisted websites; and prevents the endpoint devices from accessing the blacklisted websites.

In various embodiments, the system further includes a network device configured to provide mirrored network traffic streams through transmission control protocol (TCP) or user datagram protocol (UDP), wherein the mirrored network traffic streams are port mirrored and encrypted. In some embodiments, the memory unit of the plurality of endpoint devices includes a mirroring module configured to ~~receive~~ mirror the network traffic data to the manager device and/or the attack prevention device, wherein the mirroring comprises creating and sending a copy of network data packets. The mirrored network traffic streams are decrypted mirrored traffic streams and are received in a parallel TCP or UDP connection by the manager device.

In various embodiments, the content aggregation module is configured to determine fully qualified domain names of the accessed websites using reverse domain resolution; determine specific URLs accessed based on HTTP traces; and access URL contents from the accessed sites using web scraping tools. The system further includes a database for storing the data collected by the one or more manager devices. In one embodiment, the attack prevention device and the manager device are collocated. In various embodiments, the SNMP proxy module may be configured to track suspicious uploads to an external network. In some embodiments, the manager device may be configured to receive mirrored traffic streams associated with suspicious upload; and decrypting the suspicious uploads to determine the upload content. In some embodiments, the system of claim 13, wherein the manager device is configured to: create a training dataset, a validation dataset, and a test dataset from historical network traffic. The manager device trains the deep learning model using the training dataset to detect presence of a malware associated with the network traffic. Further, the deep learning model is tuned using the validation dataset and the performance of the deep learning model is evaluated using the test dataset. This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
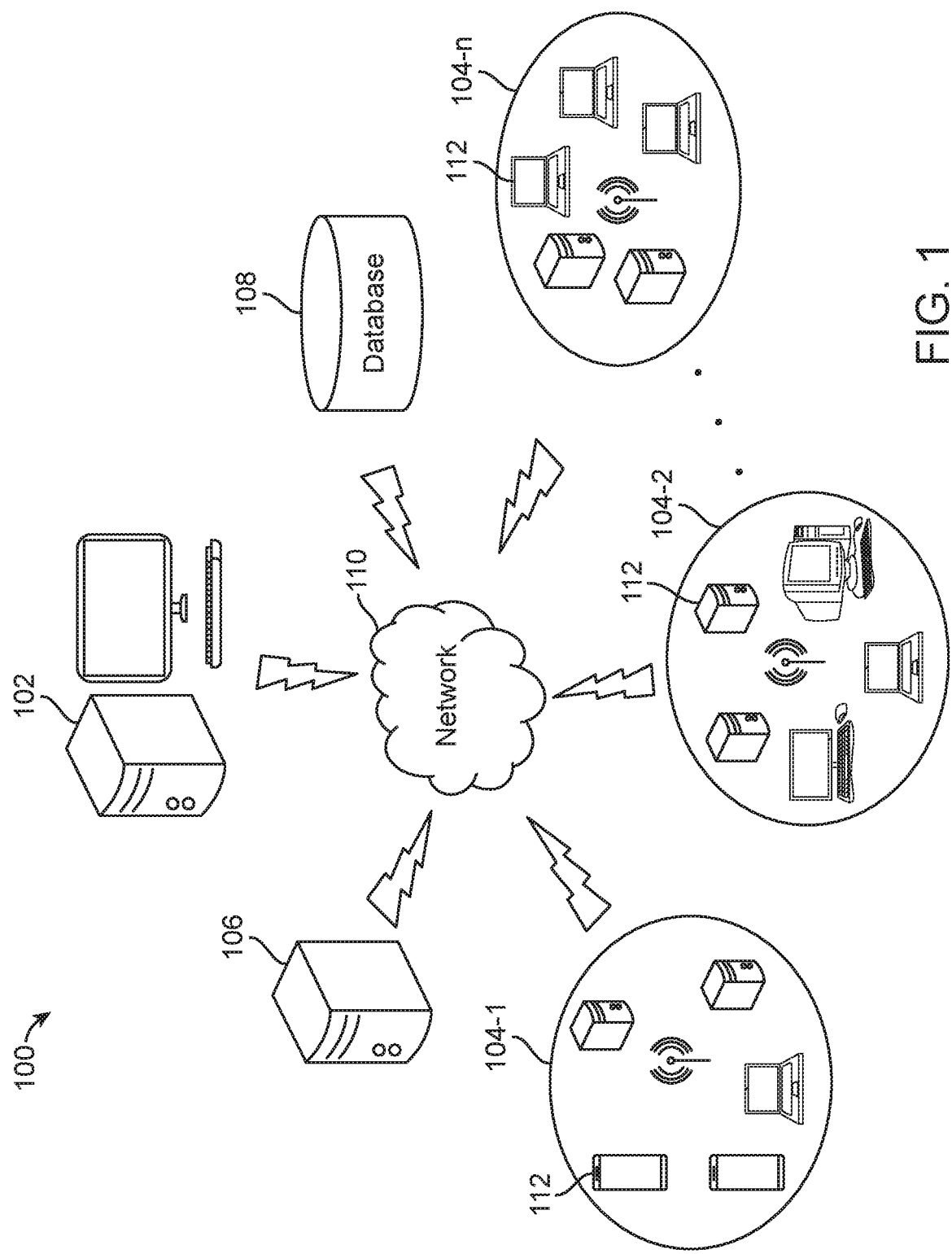
FIG. 1 illustrates a system environment for detecting and preventing data exfiltration attacks, according to an embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on". Referring to the drawings, like numbers indicate like parts throughout the views. Additionally, a reference to the singular includes a reference to the plural unless otherwise stated or inconsistent with the disclosure herein.

The various architectural components of the present invention may be distributed across various special purpose or general purpose computing devices, including various hardware components, such as personal computers, servers, laptops, hand-held devices, cell phones or the like, as discussed in greater detail below.

The term "computing device" encompasses devices, such as servers, desktop computers, laptop computers, tablet computers, personal digital assistants (PDA), smartphones, mobile phones, smart devices, appliances, sensors, or the like. The computing devices may include processing units, memory units, video or display interfaces, input/output interfaces, video or audio recording units, buses that connect the various units, network interfaces, peripheral interfaces, and the like. It may include any client device or a series thereof that may perform the desired computing operation and may include "rich" devices that are capable of performing a high degree of data processing, such as desktop personal computers (PCs) and "thin" clients that are less capable of processing data such as cellular phones and pagers. It is understood that the distinction between a rich client and a thin client is a spectrum; there are many devices (hand-held or Tablet PCs) for example, that fall in the middle of the spectrum. Regardless of the device type or the processing capability of the client, most client devices may be operated by a user in either an online or offline state.

The invention in its various embodiments proposes an asynchronous streaming method in simple network management protocol. The present subject matter includes a method and system for streaming management information base data using simple network management protocol.

A system environment 100 for prevention and detection of data exfiltration attack is illustrated in FIG. 1, according to one embodiment of the present subject matter. The environment 100 primarily includes a manager device 102, one or more local networks 104-1, 104-2, . . . , 104-n, an attack prevention device or console device 106, a database 108 communicating with each other over a network 110. The local networks 104-1, 104-2, . . . , 104-n may include a plurality of endpoint devices 112. In various embodiments, manager devices 102 may be locally incorporated in the networks 104-1, 104-2, . . . , 104-n. Alternatively, the manager device 102 may be deployed centrally in the network 110 as well as locally in the local networks 104-1, 104-2, . . . , 104-n.

Each local network 104 may not necessarily be located in the same location, however, they may be located in a close proximity. For example, each local network 104 here may refer to networks established in different organizations in a business cluster, which may be an agglomeration of one or more of manufacturing-related organizations or companies, services-related companies, or IT companies.

In various embodiments, the units 102, 106, 108, 112 and other components in FIG. 1 may be computing devices, such as servers, desktop computers, laptop computers, tablet computers, personal digital assistants (PDA), smartphones, mobile phones, smart devices, appliances, sensors, or the like. The computing devices may include processing units, memory units, network interfaces, peripheral interfaces, and the like. Some or all of the components may comprise or reside on separate computing devices or on the same computing device.

In various embodiments, networks may refer generally to any type of data or telecommunication network including, without limitation, data networks, such as LANs, WANs, WLANs, MANs, internets, intranets, satellite networks, telco networks, and the like. Such networks or portions thereof may utilize any one or more different topologies, such as bus, star, ring, loop, etc., over different transmission media, such as wired/RF cable, RF wireless, millimeter wave, optical, etc.).

In some embodiments, the devices may be configured to utilize various communication protocols, such as Worldwide Interoperability for Microwave Access (WiMAX), 5G, 5G-New Radio, High Speed Packet Access (HSPA), Long Term Evolution (LTE), Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, and the like. In other embodiments, various communications or networking protocols including, but not limited to, 3GPP, 3GPP2, WAP, DOCSIS, IEEE Std. 802.3, ATM, X.25, SONET, Frame Relay, SIP, TCP/UDP, FTP, RTP/RTCP, H.323, and the like, may also be used.

Figure 2:
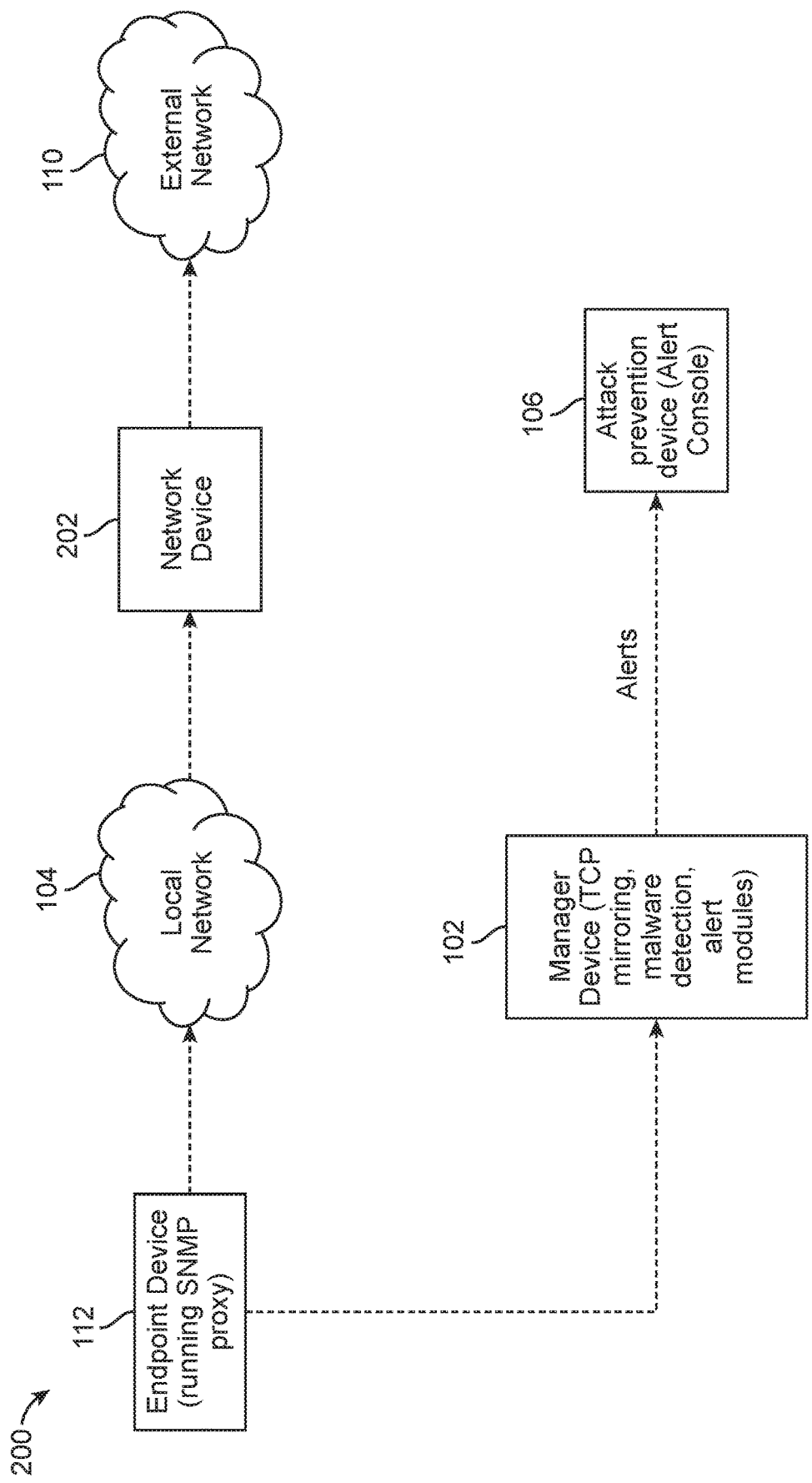
FIG. 2 illustrates a block diagram of the system, according to an embodiment of the present subject matter.

A block diagram of the system for detecting and preventing data exfiltration attacks is illustrated in FIG. 2, according to one embodiment of the present subject matter. The system primarily includes the manager device 102, attack prevention device 106, endpoint device 112 in the local network 104. In some embodiments, the manager device 102 and the attack prevention device 106 may be implemented as a single computing device.

In various embodiments, the manager device 102 and the endpoint devices 112 may establish a communication link after an authentication step. The authentication process may involve the plurality of endpoint devices 112 receiving an authentication request from a manager device 102. The plurality of endpoint devices are installed with SNMP agent and SNMP proxy as will be described later. An authentication response is transmitted by the plurality of endpoint devices to the manager device. The authentication response may indicate an approval or rejection for communication.

The endpoint devices 112 are configured to run SNMP proxy to instantaneously stream device information. Users in an organization may connect to the external network 110, such as internet through a network device 202. Network device may include firewalls, virtual private network (VPN) facilitating devices, etc. The manager device 102 may receive streamed data associated with the endpoint device 112 through the SNMP proxy. In various embodiments, the SNMP versions deployed may be any of the existing versions including, but not limited to, SNMP v1, SNMP v2, SNMP v2c, SNMP v3, etc. The manager device 102 may detect presence of malware from the received data using machine learning techniques. The received data may include the SNMP information streamed from the end point and from the mirrored TCP/UDP streams terminating at that end point. On detection of malware, the manager device 102 may send alerts to the attack prevention device 106 for prevention, mitigation, and recovery operations.

Figure 3:
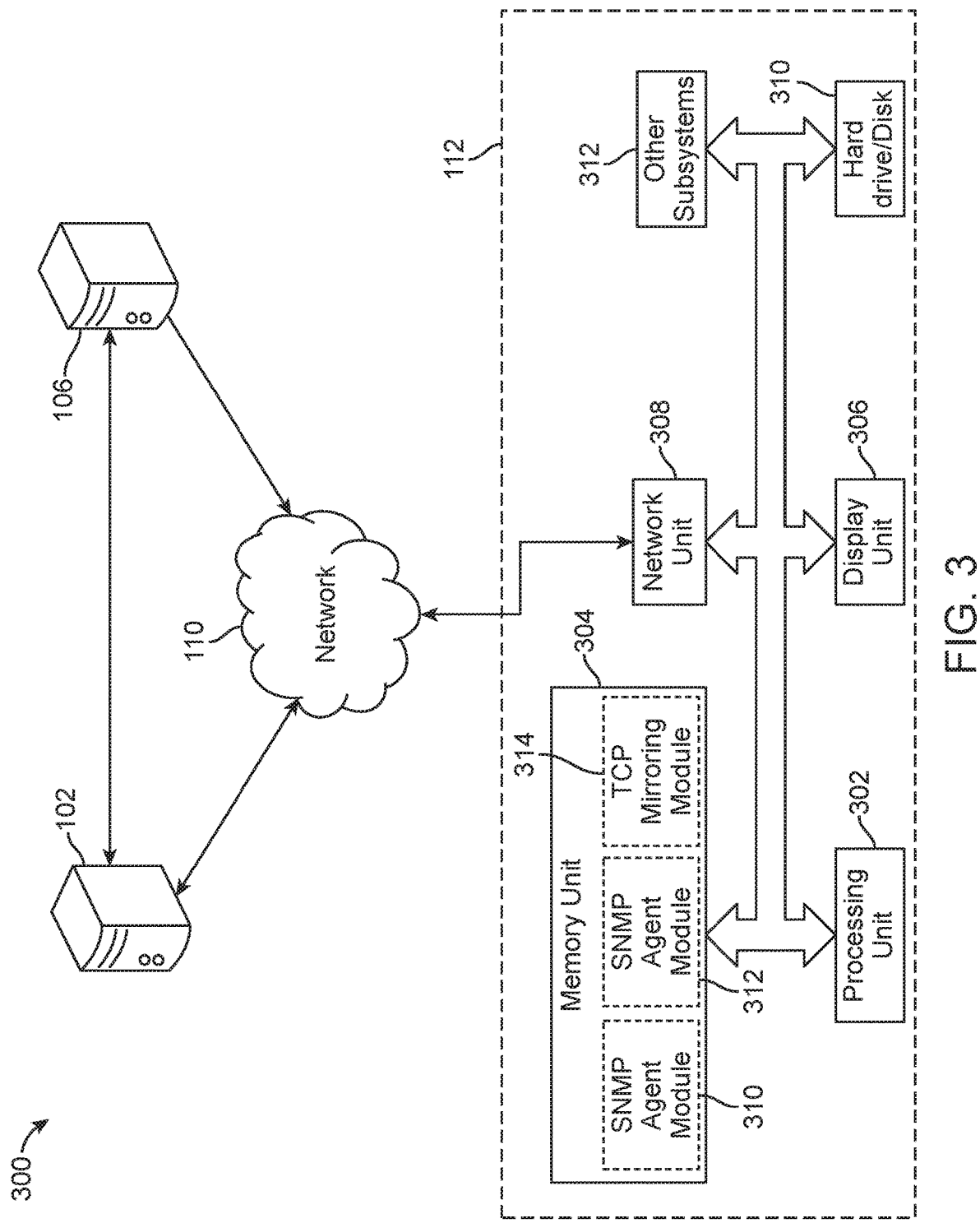
FIG. 3 illustrates architecture of the endpoint device in the system environment, according to an embodiment of the present subject matter.

An architecture diagram of the endpoint devices 112 is illustrated in FIG. 3, according to one embodiment of the present subject matter. Each endpoint device 112 includes processing units 302, memory unit 304, display unit 306, network unit 308, hard disk 310, and other subsystems 312. The memory unit 304 includes a plurality of modules including a SNMP agent module 310, SNMP proxy module 312, mirroring module 314. In various embodiments, the modules may be implemented as software to be executed by the processing unit 302. The software may include a series of instructions or commands stored in the memory unit 304.

The SNMP proxy module 312 may be configured to retrieve information associated with the endpoint device. The device information may be MIB data, which may include object information associated with the endpoint device 104. Each MIB is addressed or identified using an object identifier (OID), which is often a device's setting or status. The OID uniquely identifies a managed object in the MIB hierarchy and each managed object is made up of one or more variables called object instances, which are also identified by OIDs. The MIB may be organized hierarchically and depicted as a tree structure.

In various embodiments, the SNMP proxy module 312 may be coupled to SNMP agent module 310 to retrieve endpoint device information. The SNMP agent module 310 may be configured to fetch MIB values using operating system dependent procedure calls and application programming interfaces which help to report the data to the MIB implementation code. The agent module stores these values in a MIB database and responds to queries to return values of MIB variables. The SNMP proxy module 312 may query the agent periodically and sends initially parts of the whole MIB and then on just the changes that occur to the MIB variables may be streamed.

In various embodiments, the endpoint device may encrypt the MIB data or information into custom or standard data in the data payload portion of a packet that is encapsulated in a standard TCP and IP header fields. In another embodiment, the endpoint device may communicate with the manager device using data encoded in customized or standard form in the data payload portion of packets encapsulated by TCP and IP header fields.

Figure 4:
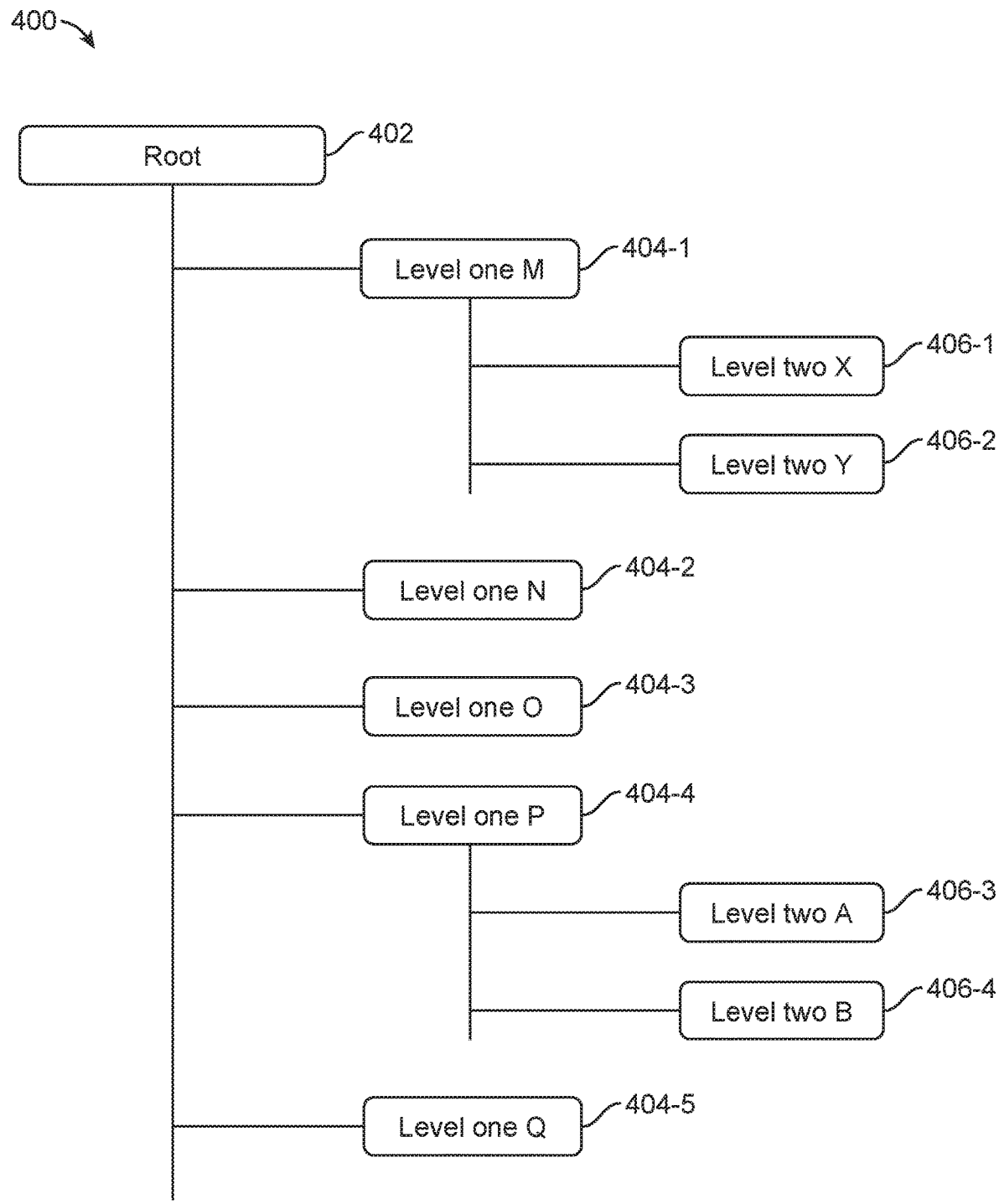
FIG. 4 illustrates a MIB tree structure, according to an example of the present subject matter.

An example MIB tree structure is illustrated in FIG. 4, according to one embodiment of the present subject matter. The MIB tree structure depicts an organized hierarchical representation of the MIB data with a plurality of levels. The MIB tree originates from a root 402, which may be extended further to branches or leaves, that are represented in different levels. As shown, the tree may branch out to level one 404-N, some of which may further branch out to level two 406-N. Root level MIB object IDs (OIDs) may belong to different standard organizations. The whole MIB tree structure may be further processed and presented on a graphical user interface as MIB views of data. In various embodiments, the MIB views consisting of MIB variables of interest may be created by the SNMP agent at the endpoint device and then retrieved by the SNMP proxy.

In various embodiments, views may be disjoint comprising multiple sub-trees. For instance, differential MIB sub-trees may be depicted in disjoint views. In other embodiments, views may overlap (joint) with sub-trees repeating in several views, which offers flexibility to the manager device, is easy to implement and eliminates duplicates in data store. The MIB views may overlap (joint) with sub-trees repeating in several views. Such views offer flexibility to the manager device. The framework is easy to implement and duplicates in data store may be eliminated.

Referring back to FIG. 3, the SNMP proxy module 312 may be configured to store the device information on a local data store (not shown in figure) at respective endpoint device 112. The local data store may be an independent memory unit, such as random access memory, for allowing device information to be read and written in almost same amount of time. In various embodiments, the SNMP proxy module 312 may also be configured to create and compress MIB views and corresponding data associated with full MIB sub-tree and differential MIB sub-trees into files and then send the MIB views and corresponding data associated with full MIB sub-tree to the manager device 102 in an initial stream. Further, the SNMP proxy module 312 may receive requests for updated MIB views consisting of MIB variables of interest from the manager device 102 and in response to the requests, the SNMP proxy module 312 may stream the compressed file of the MIB views and corresponding MIB data associated with the differential MIB sub-tree to the manager device 102. The TCP mirroring module 314 may be configured to send mirrored TCP connections associated with downloads made at the endpoint devices 112 to the manager device. The mirrored TCP connections may also be sent to the manager device using port mirroring feature on network devices such as Routers and Switches. The TCP connections include network traffic data, which may be encrypted and sent to the manager device. In various embodiments, the manager device may include public and private cryptographic keys associated with the transactions performed between browser and client. The manager device may be configured to automatically decrypt the encrypted traffic data received from the network device using the cryptographic keys. In some embodiments, the mirrored traffic streams received from the endpoint device are decrypted and received in a parallel TCP or UDP connection by the manager device. The routers and switches mirroring the network traffic lie on the path between the end point device and the external destinations. The routers and/or switches intercept the traffic flowing between endpoints and external endpoints and mirror such traffic to the manager device. Port mirroring is a standard feature in industry standard Routers and Switches from all networking equipment vendors. The mirroring may involve taking a copy of all the packet contents and transferring to another port, which may be accessed using commands, such as TCP dump, tshark, etc.

Figure 5:
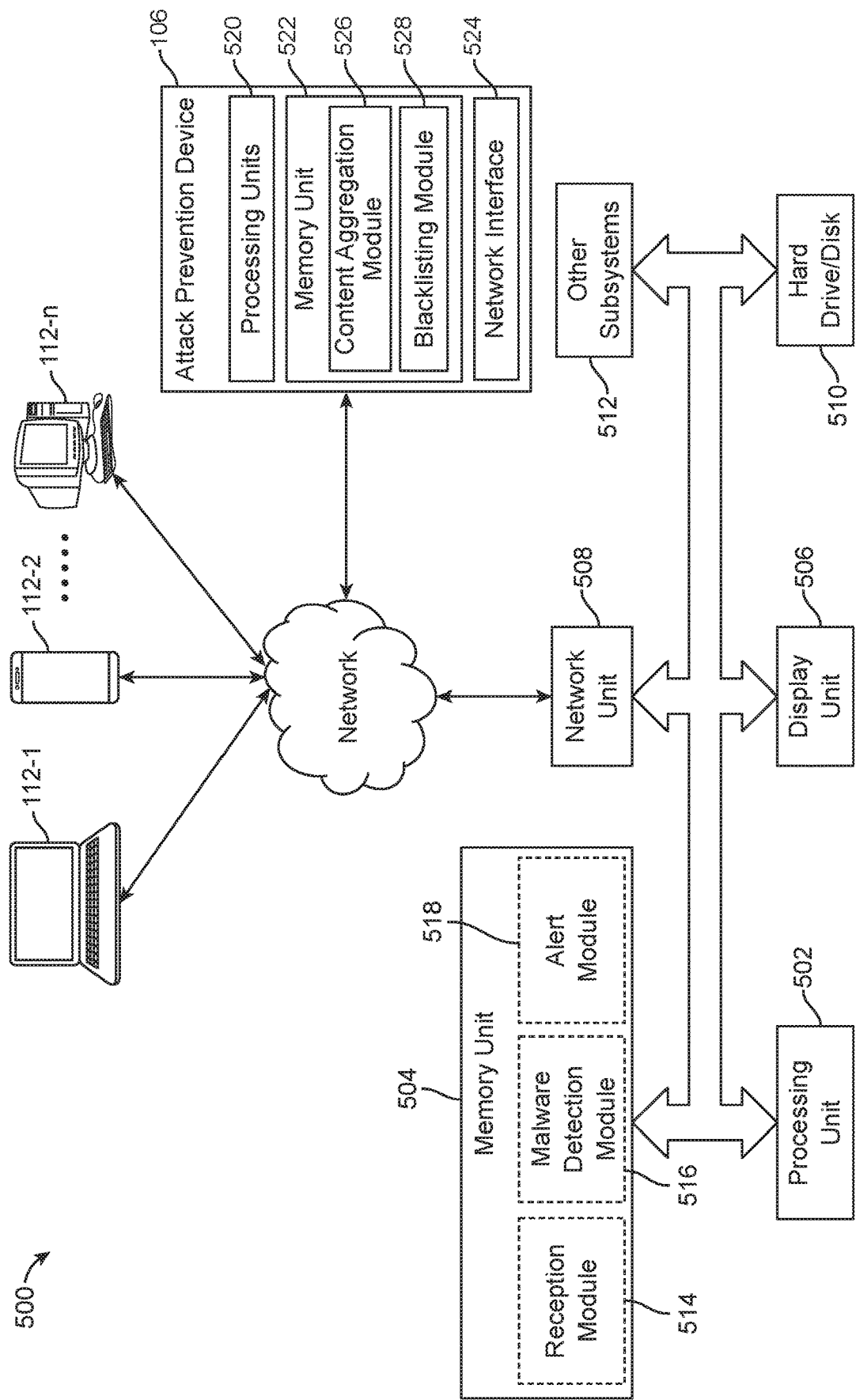
FIG. 5 illustrates architecture of manager device in the system environment, according to another embodiment of the present subject matter.

An architecture diagram of the manager device 102 and the attack prevention device 106 is illustrated in FIG. 5 according to one embodiment of the present subject matter. The manager device 102 includes processing units 502, memory unit 504, display unit 506, network interface 508, hard disk 510, and other subsystems 512. The memory unit 504 includes a plurality of modules including a reception module 514, a malware detection module 516, and an alert module 518. The reception module 514 may be configured to receive mirrored TCP connections including network traffic streams associated with the downloads made at the endpoint devices. In some embodiments, the reception module may be configured to receive the MIB data streams associated with downloads from the SNMP proxy. In some embodiments, the SNMP proxy may also be configured to track suspicious uploads to the external sites in the Internet.

The mirrored TCP connections including network traffic associated with such suspicious uploads, which are encrypted at remote end points and uploaded to external sites are received by the network device and then mirrored and sent to the manager device 102. Such uploads mirrored to the manager device are decrypted by the manager device and the contents of such uploads may be examined to trap valuable data from exiting out to the external network past the network device, i.e., firewall. In some embodiments, the SNMP Proxy at the endpoint may directly send the suspicious uploads as mirrored TCP streams to the manager device in a parallel TCP/UDP connection. As already mentioned in some embodiments, the manager device performs decryption of the received mirrored network traffic streams. The malware detection module 516 may be configured to detect presence of malware in the downloads using a deep learning model based on the mirrored network traffic streams. The alert module 518 may be configured to generate and send an alert indicative of malware detection.

In some embodiments, the method may further include creating a training dataset, a validation dataset, and a test dataset from historical network traffic. For instance, network traffic may be monitored over a period of time are stored in a database as historical network traffic. The historical network traffic may be used for creating training dataset, validation dataset, and a test dataset. The datasets may include a plurality of known blacklisted or malicious webpages and contents thereof. The contents of the webpages including, but not limited to, words, hyperlinks, images, etc., may be obtained by web scraping techniques, as known in the art. In one example, the most frequently occurring words that are scraped from the webpages may be determined based on a frequency distribution of words in the websites. The deep learning model is trained using the training dataset to detect presence of a malware associated with the network traffic based on a match between the frequently occurring content in the accessed webpages. The method also includes fine-tuning the deep learning model using the validation dataset and evaluating the performance of the deep learning model using the test dataset.

In an embodiment, the deep learning model may include one or more deep learning network columns, wherein the weights of the columns are adjusted and malware is detected based on the inputs. In some embodiments, the detection of the malware may involve analyzing the assembly language representation of a malware, such as a virus or a rootkit or any type of malware that instruments a data exfiltration attack. For instance, instructions of the malware may be grouped into its constituent algorithms that map to any of the steps/sub-steps intended to be performed by the malware instrumenting the data exfiltration attack. Further, the assembly language program of a virus/malware may be subjected to cyclometric complexity studies. The cyclometric complexity study can be fed into a reinforced learning system, such as a deep learning model and train the model to recognize a virus/malware. Additionally, the assembly language instructions of a virus/malware in its grouped (algorithm contained) form may be provided as a training dataset to a deep learning algorithm and train the model to recognize a new virus/malware when its constituents are fed as input.

In another embodiment, a frequency distribution graph plot based on (a) Individual bytes (b) Individual instructions (c) grouped instructions that implement a sub-step or steps in an algorithm as described above, may be used. After obtaining the plot a curve may be fitted and future viruses/rootkits/malware can be recognized or signalled. Further, encrypted malware and viruses may also be detected using frequency distribution curve. Further, the detection of malware need not be restricted to those malware that instrument a data exfiltration attack.

The attack prevention device 106 may primarily include processing units 520, memory unit 522, and network unit 524. The memory unit 522 may include a content aggregation module 526 and a blacklisting module 528. The content aggregation module 526 may be configured to access URL contents, such as links to other websites, associated with accessed websites using web scraping tools. The accessed contents are received by the blacklisting module, which is configured to provide the contents of the web scraped URLs to a deep learning model to determine blacklisted websites. The training of the deep learning model for determining blacklisted websites may be similar to the training as disclosed earlier. The blacklisting module 528 may then prevent the endpoint devices from accessing the blacklisted websites.

In various embodiments, the memory unit in the manager device 102 may include receiver proxy module and management module (not shown in figure). The receiver proxy module may be configured to enable legacy manager devices to have the capability to receive and store the streamed SNMP data coming in from the SNMP proxy of the endpoint device. In various embodiments, the receiver proxy module may be configured to listen on an appropriate UDP or TCP port to receive the streams of SNMP data—either as full SNMP sub-tree or as differential SNMP sub-tree. This receiver proxy may then store the data in a data store of the legacy network manager device.

The management module may be configured to perform decompression and decryption of the received MIB data from the endpoint devices in some embodiments. The decompressed and decrypted data may be in the format as follows:

Names of the MIB sub-trees on decompression and decryption:
SNMPv2-MIB::sysORID.1=OID: SNMP-MPD-MIB::snmpMPDMIBObjects.3.1.1
SNMPv2-MIB::sysORID.2=OID: SNMP-USER-BASED-SM-MIB::usmMIBCompliance
SNMPv2-MIB::sysORID.3=OID: SNMP-FRAMEWORK-MIB::snmpFrameworkMIBCompliance
SNMPv2-MIB::sysORID.4=OID: SNMPv2-MIB::snmpMIB
SNMPv2-MIB::sysORID.5=OID: TCP-MIB::tcpMIB
SNMPv2-MIB::sysORID.6=OID: IP-MIB::ip
SNMPv2-MIB::sysORID.7=OID: UDP-MIB::udpMIB
SNMPv2-MIB::sysORID.8=OID: SNMP-VIEW-BASED-ACM-MIB::vacmBasicGroup
SNMPv2-MIB::sysORID.9=OID: SNMP-NOTIFICATION-MIB::snmpNotifyFullCompliance
SNMPv2-MIB::sysORID.10=OID: NOTIFICATION-LOG-MIB::notification Log MIB Scalar and table data of the MIB items on decompression and decryption:
IF-MIB::ifNumber.0=INTEGER: 11
IF-MIB::ifIndex.1=INTEGER: 1
IF-MIB::ifIndex.2=INTEGER: 2
IF-MIB::ifIndex.3=INTEGER: 3
IF-MIB::ifIndex.4=INTEGER: 4
IF-MIB::ifIndex.5=INTEGER: 5
IF-MIB::ifIndex.6=INTEGER: 6
IF-MIB::ifIndex.7=INTEGER: 7
IF-MIB::ifIndex.8=INTEGER: 8
IF-MIB::ifIndex.9=INTEGER: 9

IF-MIB::ifIndex.10=INTEGER: 10
IF-MIB::ifIndex.11=INTEGER: 11
IF-MIB::ifDescr.1=STRING: lo0
IF-MIB::ifDescr.2=STRING: gif0
IF-MIB::ifDescr.3=STRING: stf0
IF-MIB::ifDescr.4=STRING: en0
IF-MIB::ifDescr.5=STRING: en1
IF-MIB::ifDescr.6=STRING: fw0
IF-MIB::ifDescr.7=STRING: en2
IF-MIB::ifDescr.8=STRING: en3
IF-MIB::ifDescr.9=STRING: p2p0
IF-MIB::ifDescr.10=STRING: bridge0
IF-MIB::ifDescr.11=STRING: utun0

The MIB views consisting of MIB variables of interest and respective data values of the MIB sub-trees may be obtained based on the decompression and decryption and stored in a local data store at the manager device. Further, the management module may be configured to perform regular manager related operations, where the data may be used for generating charts and graphs. Therefore, legacy network management devices may also use the data store in this architecture to retrieve the MIB items to plot out the necessary information through the method that is already in adoption for processing and projecting the data in dashboards. The display unit 512 may be configured to display the generated charts and graphs associated with the MIB data.

Figure 6:
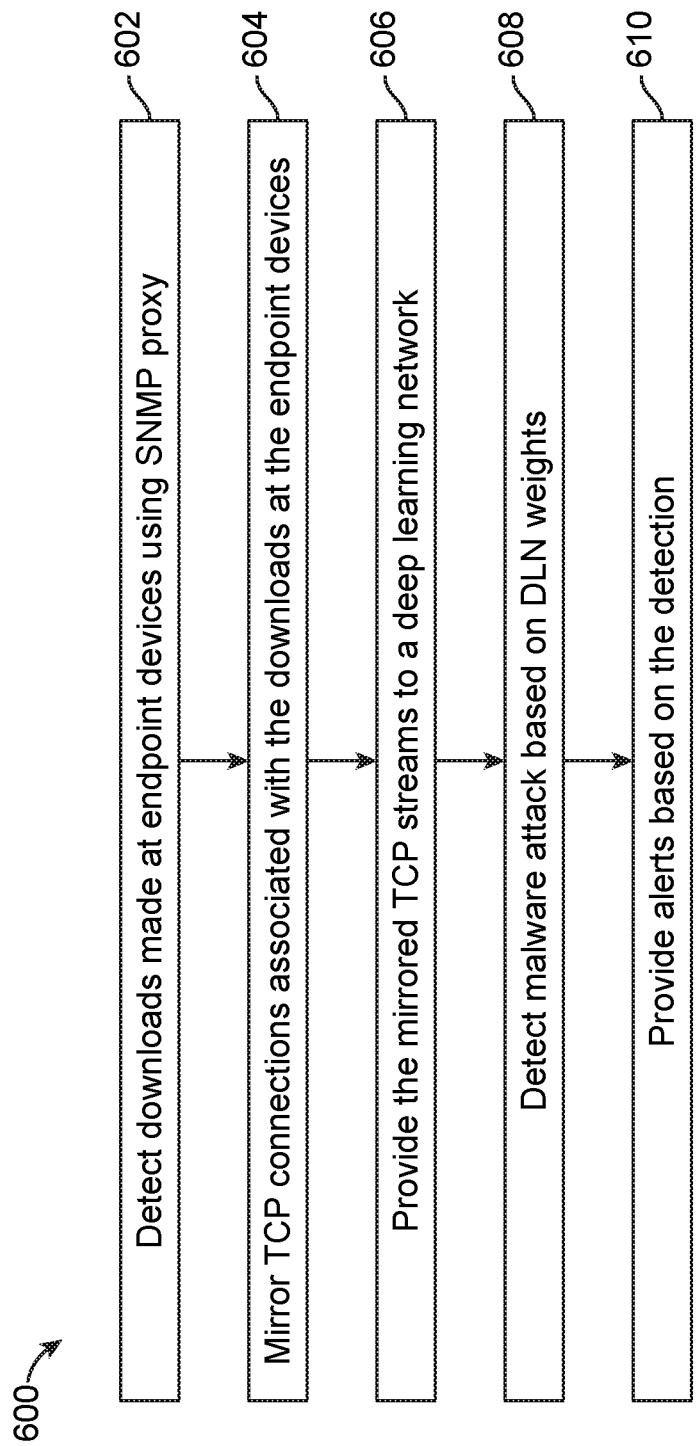
FIG. 6 illustrates a method for detecting data exfiltration attacks, according to another embodiment of the present subject matter.

A method of detecting data exfiltration attacks is illustrated in FIG. 6, according to one embodiment of the present subject matter. The method includes detecting downloads made at endpoint devices using Simple Network Management Protocol (SNMP) proxy at block 602. The method includes mirroring TCP connections (in other words sending) including network traffic streams associated with the downloads at the endpoint devices 112 at block 604 to the manager device. In one embodiment, the TCP connections may be mirrored at the endpoint device 112 and the data may be transferred to the manager device 106. In other embodiments, the tcp connections may be mirrored in an intermediate router or switch and sent to the manager device 106 The information may include TCP metadata, such as HTTP URLs, remote IP address, and port number, etc., are extracted by the Manager device from the mirrored TCP streams. The method further includes providing the mirrored TCP streams as an input to a deep learning model at block 606. The deep learning model may be trained to detect presence of malware in the downloads at block 608. Finally, the method involves sending an alert to one or more devices executing a web-based console to prevent, recover, or mitigate data exfiltration attacks at block 610. The alert may be sent by the manager device 102 to the attack prevention device 106. In some embodiments, the functions of the manager device and the attack prevention device may be implemented in a single computing device.

Figure 7:
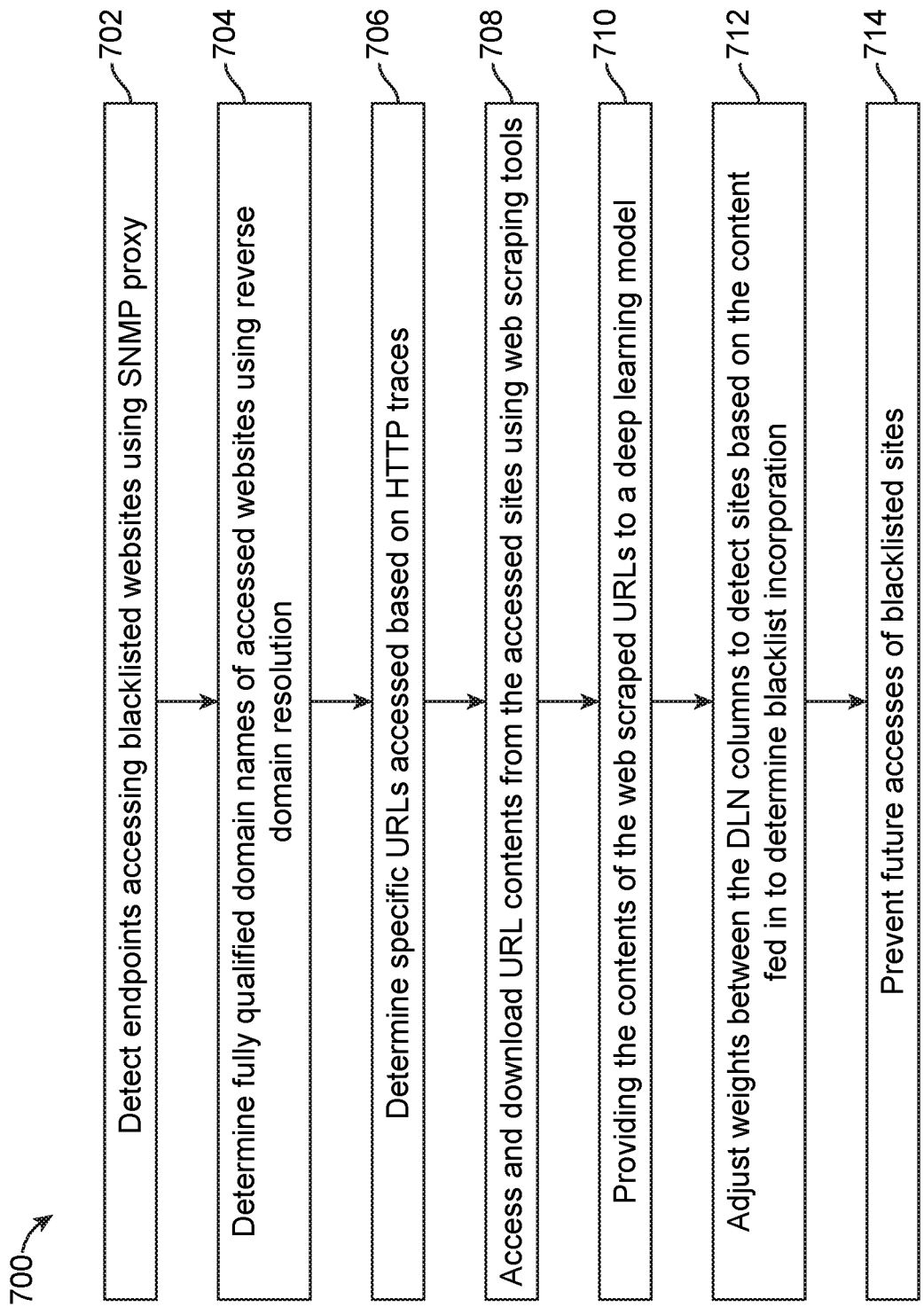
FIG. 7 illustrates a method for preventing access to blacklisted websites, according to one embodiment of the present subject matter.

A method of preventing data exfiltration attacks is illustrated in FIG. 7, according to one embodiment of the present subject matter. The method includes detecting endpoint devices that are accessing potential blacklisted websites using SNMP proxy at block 702. The method may also include determining fully qualified domain names of the accessed websites using reverse domain resolution at block 704. Further, specific URLs are determined for access based on HTTP traces at block 706. URL contents are accessed and downloaded from the accessed sites using web scraping tools at block 708. For example, to detect access to gambling websites that could be potentially blacklisted, a fairly large sample of known gambling and gaming site URLs are accessed and the contents are accumulated into a html file.

The method may also include providing the contents of the web scraped URLs to a deep learning model at block 710. The deep learning model may determine blacklisted websites based on the contents provided as input at block 712. For example, a deep learning model uses a parsed and annotated version of the HTML file of these known sites, to reinforce itself to detect a gambling or a gaming site. Alternatively, Byte/WORD/sentence frequency distribution analysis may be done. A scatter plot and a curve may be constructed that can fit in the next time a new html page from a gaming or gambling site is accessed thus detecting that the site is a gaming or gambling site and consequently blacklisting the new site.

Further, the method may include preventing the endpoint device from accessing the blacklisted websites at block 714. If the deep learning model determines that result associated with the HTML file provided as input is positive, then the site is blacklisted. Manual intervention may also be done to check for false negatives. Similarly or false positives may also be detected. In some cases, correlation techniques may be used to ascertain false negatives or false positive outcomes. In one embodiment, reinforcement learning may be used to take in the feedback for developing the learning model. In some embodiments, the network device may receive a rule from the attack prevention device to block or prevent any access to the determined blacklisted website.

EXAMPLES

The method and system for detection and prevention of data exfiltration attacks have been further illustrated in example implementations in FIG. 8A-8E. As shown the system primarily includes the manager device 102, attack prevention device 106, endpoint device 112 in the enterprise network 104. The endpoint device 112 accesses the external network, i.e., the internet 110 through firewall device 202. The firewall device monitors and controls incoming and outgoing network traffic based on predetermined security rules. The manager device 102 in combination with attack prevention device 106, which runs an alert console, monitor, detect and prevent various types of data exfiltration attacks that the endpoint device could be subjected to.

Figure 8A:
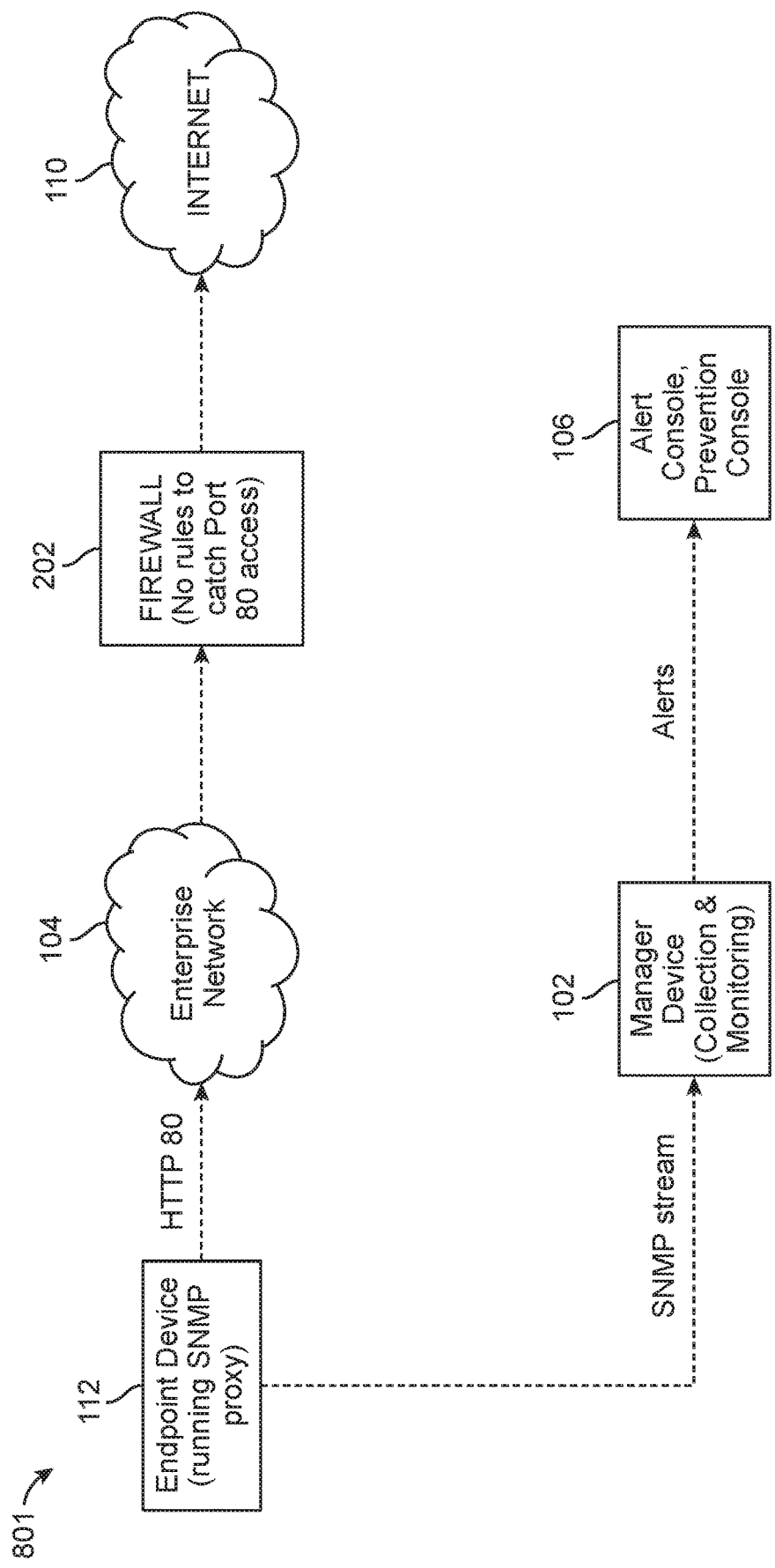
FIG. 8A-8F illustrate block diagram of system for detecting and preventing data exfiltration attacks, according to some examples of the present subject matter.

Some examples of the attacks include Port 80 based web access and their corresponding threat vectors, accessing blacklisted websites, data loss, denial of service attacks, ARP spoofing attacks, and many other state of the art hacking techniques. A block diagram for detecting and preventing threats associated with Port 80 web access is illustrated in FIG. 8A. In particular, the diagram illustrates Port 80 based web access and corresponding threat vectors occurring when firewall 202 does not have the rules to catch port 80 access. When the endpoint device 112 uses port 80 for web-client based communication, the SNMP proxy streams the device TCP state information from the endpoint device 112 to the manager device 102. On detection of any port 80 associated threats, the manager device sends the alert to alert console for prevention or mitigation.

Figure 8B:
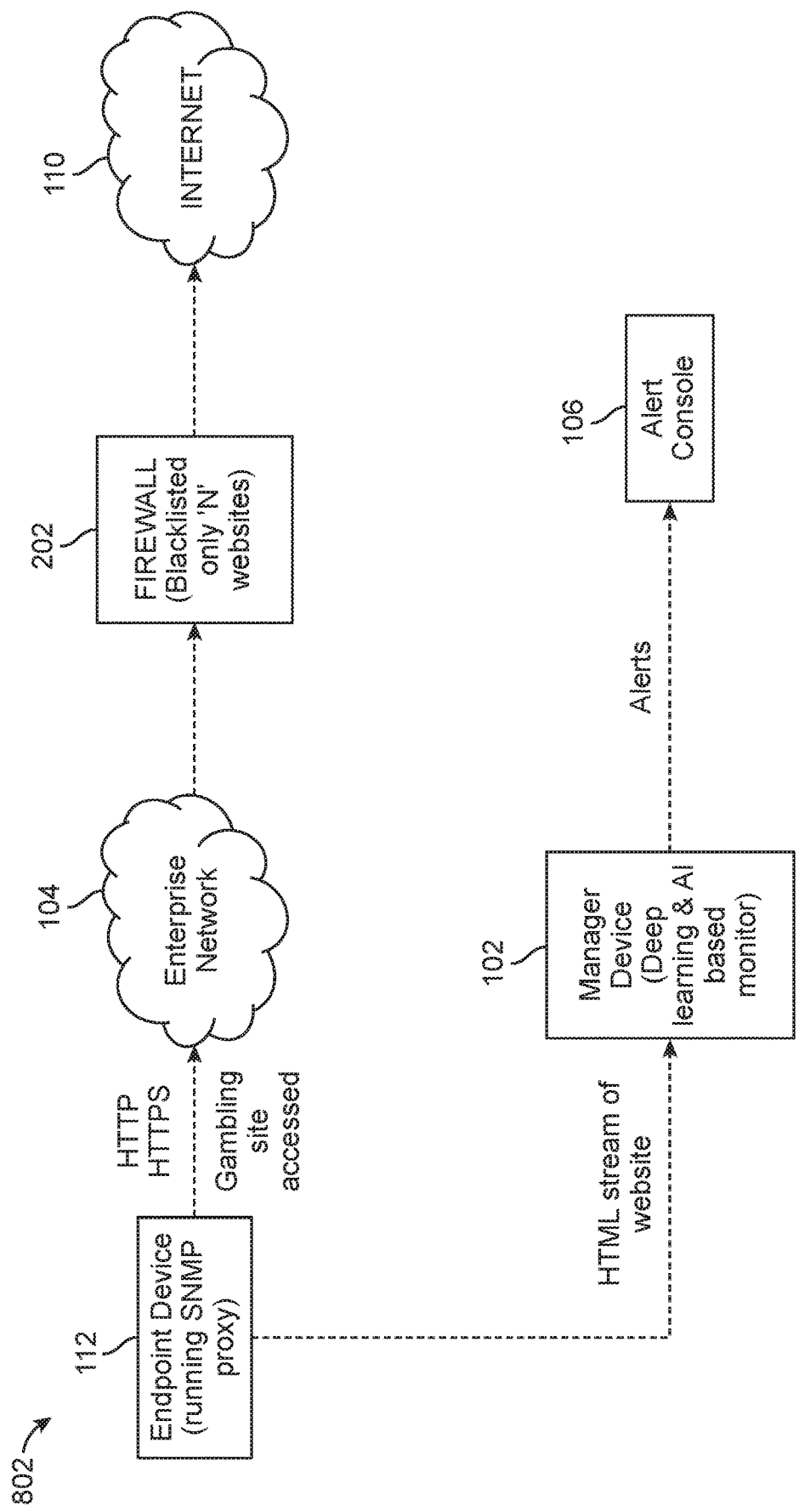
Figure 8C:
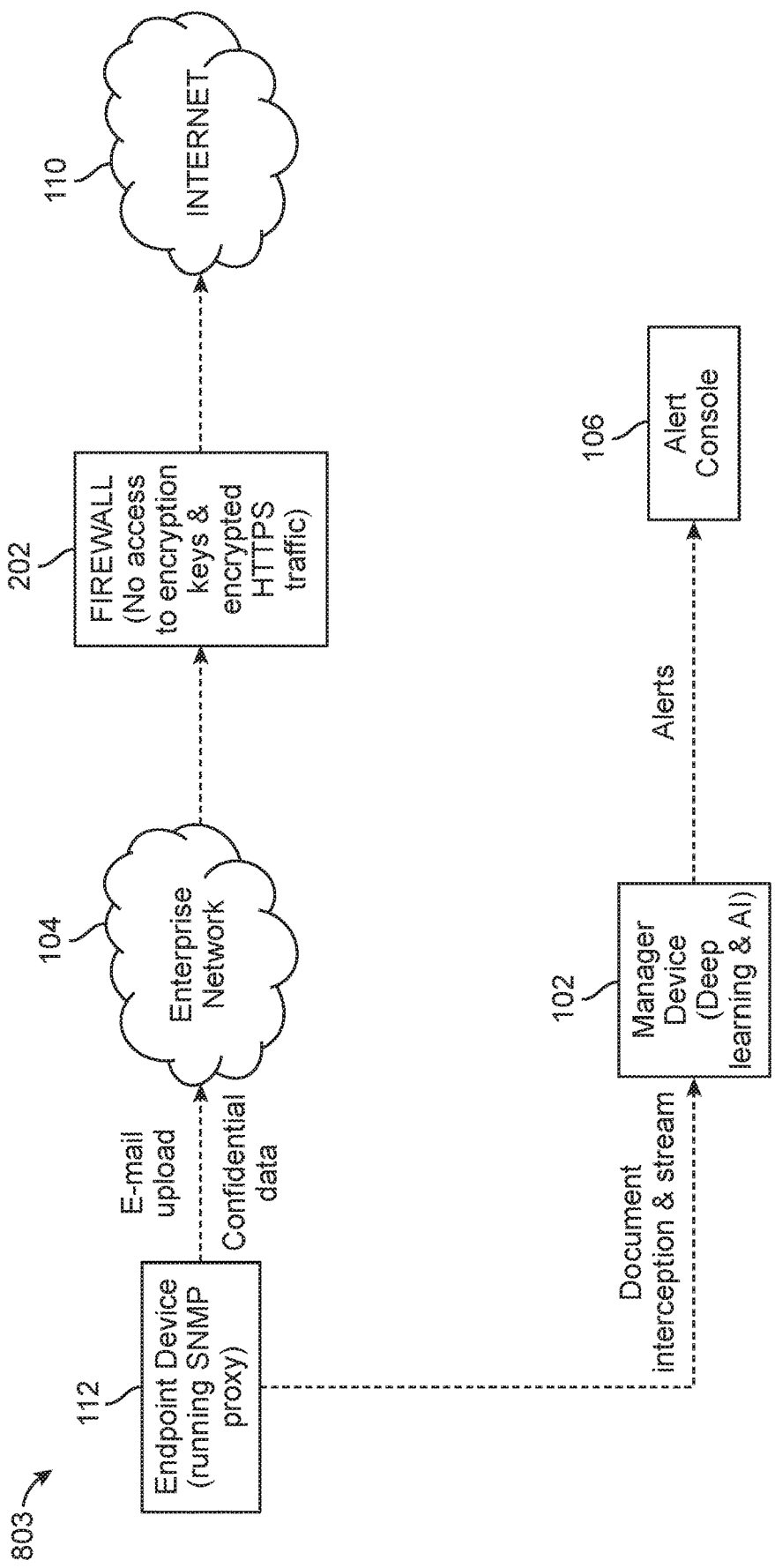

A block diagram for detecting websites that may be potentially blacklisted is illustrated in FIG. 8B. Blacklisted websites are generally blocked by the firewall and access to such websites are not permitted to the endpoint device. The firewall device blocks certain types of websites that are blacklisted, however, not all blacklisted websites are detected and blocked at the firewall device. For example, the firewall blacklists 1 . . . n websites and is unable to detect a website with potential to be blacklisted, such as gambling websites, dark web related websites, etc. The SNMP proxy detects the access to the websites and then HTML stream of the websites is sent to the manager device 102. The manager device 102 uses deep learning techniques to (a) detect presence of any malware (b) uses the deep learning network to assess whether the said site needs to be blacklisted and sends an alert to the attack prevention device for prevention and mitigation. Similarly, a block diagram of the system to prevent data loss is illustrated in FIG. 8C. In some scenarios, the firewall device does not have access to encryption keys and encrypted HTTPS traffic. If the endpoint device communicates any confidential file, such a document or image, through e-mail, the SNMP proxy detects the communication. The SNMP streams the relevant information to the manager device, which may use deep learning techniques to prevent document upload to e-mail even when the firewall has no access to the encryption keys and encrypted HTTPS traffic.

Figure 8D:
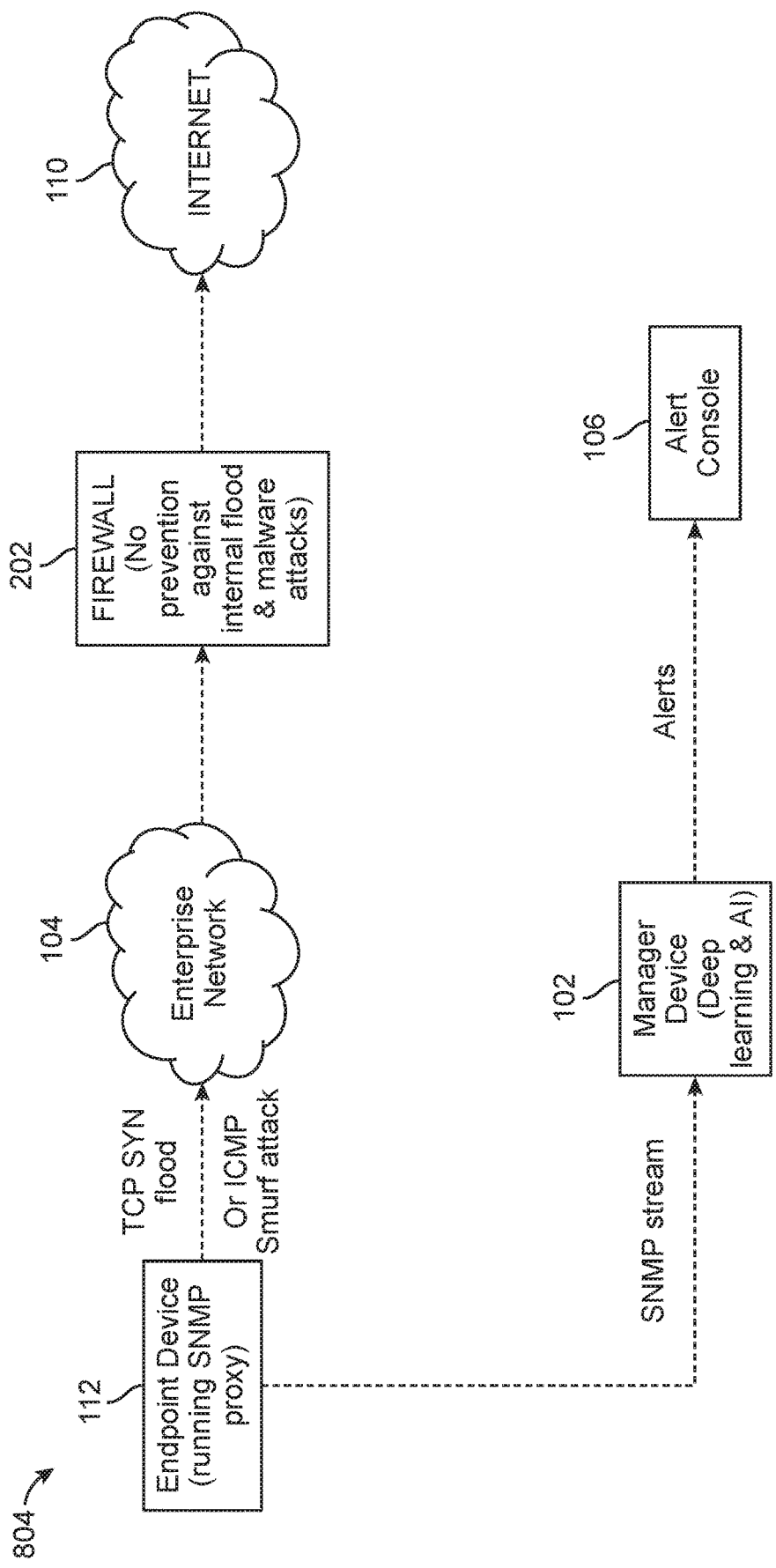
Figure 8E:
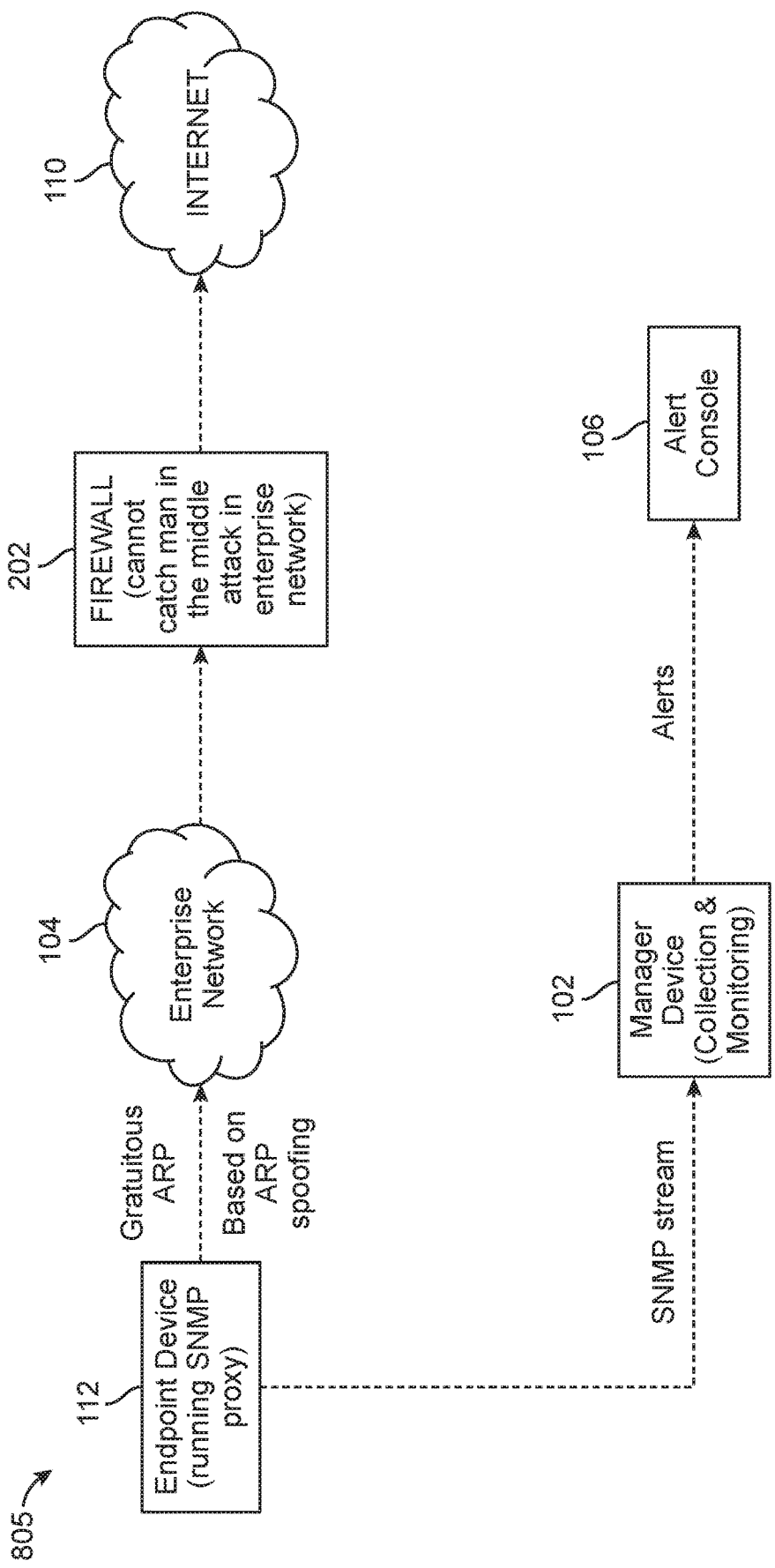

Additionally, a block diagram of a system for detecting and preventing denial of service attacks is illustrated in FIG. 8D. The firewall device may not be capable of preventing network internal flood attacks caused by malware. Such attacks including TCP SYN attack, ICMP Smurf attacks, and other such DOS attacks, is detected at the manager device using deep learning techniques using the data streamed by the SNMP proxy at the endpoint device. Further, a block diagram of a system for detecting ARP spoofing attacks is illustrated in FIG. 8E. The ARP spoofing attacks may be based on gratuitous ARP in a wireless as well as wired environment and the firewall may not catch the man-in-the-middle attack within the enterprise network. The manager device detects the attack using data streamed from the SNMP proxy and then sends an alert to the alert console for prevention and mitigation.

Figure 8F:
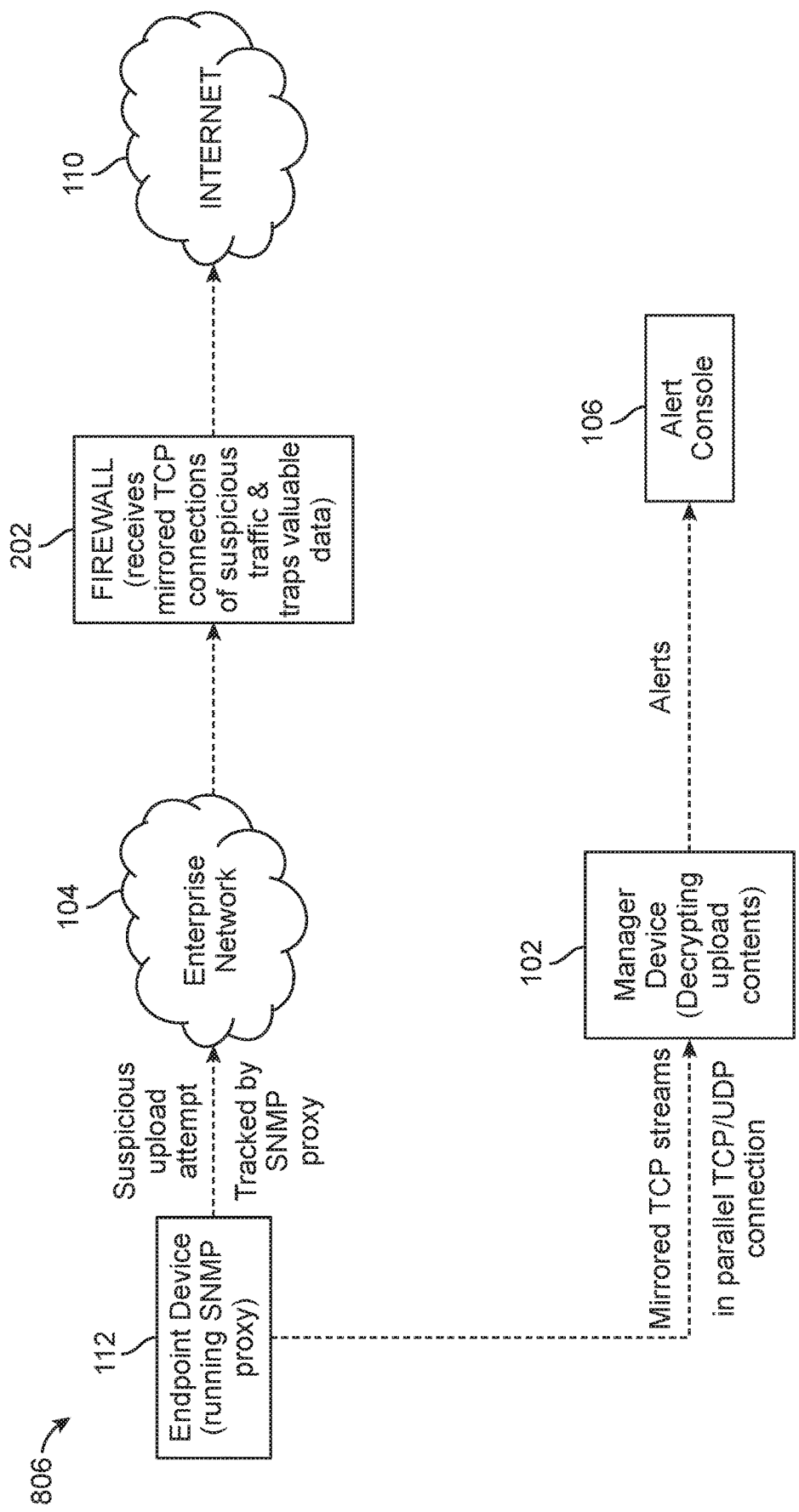

Further, a block diagram for preventing important data, such as "Crown Jewel" data, is illustrated in FIG. 8F. The SNMP proxy at the endpoint device tracks suspicious uploads to the external websites in the Internet. The mirrored TCP connections including network traffic associated with such suspicious uploads, which are encrypted at remote end points and uploaded to external sites are received by the network device and then mirrored and sent to the manager device 102. Such uploads mirrored to the manager device are decrypted by the manager device and the contents of such uploads may be examined to trap valuable data from exiting out to the external network past the firewall. In some aspects, the SNMP Proxy at the endpoint directly sends the suspicious uploads as mirrored TCP streams to the manager device in a parallel TCP/UDP connection, which is then decrypted and examined by the manager device to determine patterns in the upload activity and look out for "Crown Jewel" data that is sought to be exfiltrated from the enterprise network.

The above subject matter and its embodiments provide method and system for detecting and preventing data exfiltration attacks in a network. The detection and prevention is improved using the SNMP streaming technique as it utilizes lesser network bandwidth. The method eliminates possibility of polling interval overlap and reducing the CPU cycles on manager devices. This increases the efficiency and lifecycle of the manager devices. Additionally, the polling time becomes irrelevant as the SNMP proxy polls the data locally on the device. The SNMP proxy also performs detection of suspicious uploads and streams it directly to the manager device in real-time, without requiring interception from a web-proxy or firewall. Further, encryption of the stream data ensures the security of the device data.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A method of detecting and preventing data exfiltration attacks in a network, the method comprising:
   detecting downloads made at one or more endpoint devices comprising a first memory unit coupled to a first processing unit using a Simple Network Management Protocol (SNMP) proxy module within the first memory unit, wherein the SNMP proxy module detects download activity based on management information base (MIB) data;
   mirroring network traffic associated with the downloads;
   identifying access to potential blacklisted websites at the endpoint device using the SNMP proxy module;
   receiving the MIB data streams associated with the downloads from the SNMP proxy and mirrored network traffic streams associated with the downloads by a reception module of a manager device comprising a second memory unit coupled to a second processing unit, wherein the memory unit comprises a plurality of modules;
   providing the mirrored network traffic streams as an input to a malware detection module for detecting presence of malware in the downloads using a deep learning model;
   generating and sending an alert to one or more devices to prevent, recover, or mitigate data exfiltration attacks, by an alert module of the manager device;
   receiving the generated alert by an attack prevention device comprising a third memory unit coupled to a third processing unit, wherein the memory unit comprises a plurality of modules;
   accessing URL contents associated with accessed websites using web scraping tools by a content-aggregation module of the attack prevention device;
   providing the contents of the web scraped URLs by a blacklisting module to the deep learning model, wherein the deep learning model determines if a website is blacklisted or blacklisting the website if it needs to be potentially blacklisted; and
   preventing the endpoint devices from accessing the blacklisted websites by the blacklisting module.

2. The method of claim 1, wherein the mirrored traffic streams received from a network device or the endpoint devices are port mirrored in an encrypted form.

3. The method of claim 2, wherein the mirrored traffic streams received from the endpoint device are in a decrypted form, and wherein the decrypted mirrored traffic streams are received in a parallel TCP or UDP connection by the manager device.

4. The method of claim 1 further comprising:
determining fully qualified domain names of the accessed websites using reverse domain resolution;
determining specific URLs accessed based on HTTP traces; and
accessing URL contents from the accessed sites using web scraping tools.

5. The method of claim 1 further comprising:
tracking, by SNMP proxy at the endpoint device, suspicious uploads to an external network;
receiving, by the manager device, mirrored traffic streams associated with the suspicious uploads from a network device; and
decrypting, by the manager device, the suspicious uploads to determine upload content.

6. The method of claim 5, wherein the manager device receives the mirrored traffic streams directly from the SNMP proxy module in a parallel TCP/UDP connection.

7. The method of claim 1, wherein mirroring the network traffic comprises creating and sending a copy of network data packets associated with downloads.

8. The method of claim 1 further comprising:
creating a training dataset, a validation dataset, and a test dataset from historical network traffic;
training the deep learning model using the training dataset to detect presence of a malware associated with the network traffic;
tuning the deep learning model using the validation dataset; and
evaluating the performance of the deep learning model using the test dataset.

9. A system for detecting and preventing data exfiltration attacks in a network, the system comprising:
a plurality of endpoint devices comprising a first memory unit coupled to a first processing unit, wherein the first memory unit comprises a SNMP proxy module configured to:
detect downloads made at the plurality of endpoint devices based on management information base (MIB) data; and
identify access to potential blacklisted websites at the endpoint device;
one or more manager devices for monitoring and detecting data exfiltration attacks, wherein the manager device comprises:
a second memory unit coupled to a second processing unit, wherein the memory unit comprises a plurality of modules executed by the processing unit, wherein the plurality of modules comprises:
a reception module configured to receive MIB data streams associated with the downloads from the SNMP proxy and mirrored network traffic streams associated with the downloads;
a malware detection module configured to detect presence of malware in the downloads using a deep learning model based on the mirrored network traffic streams;
an alert module configured to generate and send an alert indicative of malware detection;
an attack prevention device configured to receive the alerts, the attack prevention device comprising a third memory unit coupled to a third processing unit, wherein the third memory unit comprises:
a content-aggregation module configured to access URL contents associated with accessed websites using web scraping tools;
a blacklisting module configured to:
provide the contents of the web scraped URLs to a deep learning model, wherein the deep learning model determines blacklisted websites; and
prevent the endpoint devices from accessing the blacklisted websites.

10. The system of claim 9 further comprising a network device configured to provide mirrored network traffic streams through transmission control protocol (TCP) or user datagram protocol (UDP), wherein the mirrored network traffic streams are port mirrored in an encrypted form.

11. The system of claim 9, wherein the memory unit of the plurality of endpoint devices comprises a mirroring module configured to mirror TCP connections to the manager device and/or the attack prevention device, wherein the mirroring comprises creating and sending a copy of network data packets.

12. The system of claim 11, wherein the mirrored network traffic streams are decrypted mirrored traffic streams and are received in a parallel TCP or UDP connection by the manager device.

13. The system of claim 9, wherein the content-aggregation module is configured to:
determine fully qualified domain names of the accessed websites using reverse domain resolution;
determine specific URLs accessed based on HTTP traces; and
access URL contents from the accessed sites using web scraping tools.

14. The system of claim 9, further comprising a database for storing the data collected by the one or more manager devices.

15. The system of claim 9, wherein the attack prevention device and the manager device are collocated.

16. The system of claim 9, wherein the manager device is configured to:
create a training dataset, a validation dataset, and a test dataset from historical network traffic;
train the deep learning model using the training dataset to detect presence of a malware associated with the network traffic;
tune the deep learning model using the validation dataset; and
evaluate the performance of the deep learning model using the test dataset.

17. The system of claim 9, wherein the SNMP proxy module is configured to track suspicious uploads to external network.

18. The system of claim 17, wherein the manager device is configured to: receive mirrored traffic streams associated with suspicious upload; and decrypting the suspicious uploads to determine the upload content.

* * * * *